United States Patent [19]

Blake et al.

[11] 4,227,935
[45] Oct. 14, 1980

[54] HIGH DRY HIDE TIO₂ SLURRIES

[75] Inventors: David W. Blake; Alberto W. Delgado; Gerard M. Sheehan, all of Savannah, Ga.

[73] Assignee: American Cyanamid Company, Stamford, Conn.

[21] Appl. No.: 12,677

[22] Filed: Feb. 16, 1979

[51] Int. Cl.² ............................................. C09C 1/36
[52] U.S. Cl. .................................. 106/308 B; 106/300
[58] Field of Search ............................ 106/308 B, 300

[56] References Cited

U.S. PATENT DOCUMENTS

| | | | |
|---|---|---|---|
| 3,595,822 | 7/1971 | Swank | 106/308 B |
| 3,847,640 | 11/1974 | Daubenspeck et al. | 106/308 B |
| 3,941,603 | 3/1976 | Schmidt | 106/300 |
| 4,022,636 | 5/1977 | Murray | 106/308 B |
| 4,097,301 | 6/1978 | Wildt | 106/308 B |
| 4,115,144 | 9/1978 | Chambers et al. | 106/300 |
| 4,170,485 | 10/1979 | Blake et al. | 106/300 |

*Primary Examiner*—Helen M. McCarthy
*Attorney, Agent, or Firm*—Bruce F. Jacobs

[57] ABSTRACT

High dry hide titanium dioxide pigment slurries are prepared from in-process material which is treated with low amounts of aluminum oxide.

8 Claims, No Drawings

HIGH DRY HIDE TiO$_2$ SLURRIES

This invention relates to titanium dioxide slurries of high solids content which are prepared wholly or in part from in-process material from either the sulfate or the chloride process for making TiO$_2$, which in-process material has not been dried or milled and has a low amount of an aluminum oxide coating. The resultant slurries have excellent resistance to hard settling, good viscosity stability after slurry aging, and paint optical properties at least equal to those of conventional high dry hide slurries made entirely with conventionally prepared titanium dioxide pigments.

Titanium dioxide is at present the premier white pigment of commerce. It is generally produced by either hydrolyzing an aqueous solution of a titanium salt, such as a sulfate, and calcining the hydrolysate at 750°–1000° C., or oxidizing a titanium halide, e.g. titanium tetrachloride, at elevated temperatures of 800° C. or higher, followed by cooling to a temperature below 600° C. The product resulting from the calcination or oxidation contains a substantial amount of oversized, gritty TiO$_2$ particles which are broken up by either wet or dry grinding. Drying, following the wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An effective means for dry grinding is a fluid energy mill in which the pigment particles are conveyed by a gaseous fluid, such as air or steam, into the outer portion of an inwardly spiraling vortex at high velocity and in a manner which will maintain the vortex at a high rotative speed and relatively low inward speed whereby the pigment aggregates may be fractured.

Previously, titanium dioxide slurries were prepared by placing the dry finished pigment in water with an appropriate dispersant. U.S. Pat. No. 3,536,510 describes high solids content anatase slurries in which dry milled anatase TiO$_2$ is dispersed in water using appropriate dispersants, preferably alkanolamines. U.S. Pat. No. 3,758,322 describes high solids slurries in which grit-free deflocculated, non-hydrous oxide treated TiO$_2$ is used to make rutile slurries, using an appropriate dispersant. German Pat. No. 1,908,611 relates to high solids content rutile TiO$_2$ water mixtures using finished rutile TiO$_2$-water mixtures dispersed with sodium polyphosphates.

It has now been discovered that high dry hide titanium dioxide slurries may be prepared from in-process material, i.e. that which has not been fluid energy milled and dried, if it is coated with low amounts of aluminum oxide. This material may be used either alone or in combination with conventionally prepared, dried and milled pigment to produce the slurries of the present invention.

The starting titanium dioxide material for use in the present invention may be obtained by either the "chloride process" or the "sulfate process." Preferably, the combustion or calcination, depending upon the process, is performed in the presence of an aluminum salt such as aluminum chloride such as to "burn in" up to about 2% by weight aluminum oxide into the titanium dioxide. This material exits the reactor or calciner and is mixed with water to form a raw slurry having about 15–30% by weight solids which contains a substantial amount of oversized gritty TiO$_2$ particles which are then broken up by grinding in such as sand mills. The slurry is then hydroclassified by passing it through a 325 mesh (U.S. Standard) screen. Preferably, a vibratory double deck screen is used. It is this material passing through the screen that is used to make the high dry hide slurries of the present invention. This material is hereinafter referred to as the "fines."

The fines, which are still in slurry form, are then coated with about 0.3 to 3% by weight of hydrous aluminum oxide. If the aluminum oxide is used in less than about 0.3%, there is difficulty in filtration to subsequently obtain a solids content in the desired 55 to 70% by weight range. If more than about 3% is used, then the water retained makes it difficult to subsequently reach the desired 55 to 70% by weight solids in the filter cake. Generally, the aluminum oxide is added in the form of a salt such as sodium aluminate or related compounds. This coating step, generally with larger amounts of hydrous oxide, is well known in the titanium dioxide industry and may be performed in known manners.

The resultant low-aluminum oxide-coated titanium dioxide slurry is then made into a high dry hide, high solids content slurry by increasing the solids content to the desired 55 to 70% by weight, preferably about 60–65%, and most preferably about 62–64%. Generally, this is done by filtration or in a rotary evaporator with the addition of small amounts of standard organic dispersants for titanium dioxide. The dispersants are used in effective amounts, generally about 0.3 to 2% by weight.

Alternatively and/or additionally, the solids content may be increased by the addition of dry finished titanium dioxide pigment which has a heavy hydrous oxide coating, i.e. about 12 to 15% by weight. When dry finished pigment is used, it should be about 0 to 90% by weight of the solids of the slurry, preferably about 0 to 60%, and most preferably about 20 to 55%.

Dispersants found especially useful herein are organic polyelectrolytes and others such as 2-amino-2-methyl-1-propanol, triethanolamine, sorbitol, mannitol, and water soluble salts. For example, sodium salts of polymeric carboxylic acids, such as Tamol ® 731 and Tamol ® 850, sold by Rohm & Haas; Daxad ® 30, sold by W. R. Grace; Nopcosant ® K, sold by the Nopco Division of Diamond-Shamrock Corporation; Polywet ® ND-1 and ND-2 of Uniroyal, Inc. and Cyanamer ® P-35 of American Cyanamid Co., have been used.

The following examples are presented to further illustrate the present invention:

EXAMPLE 1

Preparation of Low Al$_2$O$_3$ Treated TiO$_2$ Slurry

Titanium dioxide pigment was prepared by the chloride process of combustion of titanium tetrachloride through the hydroclassification step. The slurry material passing through a 325 mesh U.S. standard sieve was found to have about 30% by weight solids. It was placed in a vessel and the pH raised to about 9.2 with sodium hydroxide. After heating to about 70° C., sodium aluminate in a 1:1 mixture with water was added to provide about 0.8% Al$_2$O$_3$ based upon the dry weight of TiO$_2$, and allowed to age for about 30 minutes. The pH was then adjusted to 7.0±0.2 by the addition of 20% sulfuric acid, and the coated slurry aged for about 2 hours.

The slurry was then filtered and the filter cake washed with hot water. At this point the filter cake had a solids content of about 50%.

The filter cake was reslurried by agitation and the addition of 0.63% by weight based on the dry weight of $TiO_2$ in the filter cake of 2-amino-2-methyl-1-propanol (AMP). Dry finished pigment (flat latex type having about 14% hydrous oxide coating) was then added to increase the solids content to 64% by weight. A thixotrope (Attagel®-50) and a bacteriocide (Vancide® TH) were added at the rates of 0.62 and 0.5% by weight, respectively, based upon the total slurry. This finished high solids, low aluminum oxide coated slurry was then processed through a 200 mesh Newark wire cloth sieve to break up and/or remove any $TiO_2$ agglomerates.

The resultant slurry had the following composition:

|  | % of total slurry |
| --- | --- |
| Reslurried Filter Cake | 65.4 |
| Dry $TiO_2$ | 33.3 |
| Dispersant | 0.63 |
| Thixotrope | 0.62 |
| Bacteriocide | 0.05 |

EXAMPLES 2-4

The procedure of Example 1 was repeated to prepare slurries having the compositions as shown in Table I below. Each of the reslurried filter cakes was coated with 0.6% $Al_2O_3$.

TABLE I

|  | 2 | 3 | 4 |
| --- | --- | --- | --- |
| Reslurried Filter Cake | 55.2 | 55.2 | 55.2 |
| Dry $TiO_2$ | 43.7 | 43.8 | 43.7 |
| Dispersant |  |  |  |
| AMP[1] | 0.26 | — | 0.26 |
| TSPP[2] | 0.17 | 0.32 | — |
| P-35[3] | — | — | 0.17 |
| Thixotrope | 0.67 | 0.63 | 0.67 |
| Bacteriocide |  | 0.05 | — |

[1]AMP is 2-amino-2-methyl-1-propanol
[2]TSPP is tetrasodium pyrophosphate
[3]P-35 is a sodium salt of a polyacrylic acid

EXAMPLE 5

The procedure of Example 1 was repeated except that 0.6% $Al_2O_3$ was added to the fines slurry, the slurry was increased to 66% by weight solids by means of a thin film rotary evaporator and 0.3% AMP dispersant was used to maintain the slurry in a deflocculated state. No dry finished titanium dioxide pigment was added to the slurry.

EXAMPLE 6

To determine the tinting strength of each of the above slurries, as compared to a conventionally prepared slurry from dry finished pigment having a 7.5% $Al_2O_3$ and 6.5% $SiO_2$ coating, each was made into a paint using a typical acrylic latex paint formulation. Each paint was based upon a polyacrylic latex (Rhoplex AC-490 of Rohm & Haas Co.) and contained other conventional ingredients together with one of the slurries above.

Each of the resultant paints was then tested for tinting strength by combining 200 g. of each paint with 16 g. of dilute chromium oxide green pigment, shaking the mixtures, allowing them to age overnight, forming drawdowns on Morest 017 charts using a 6"×0.003" Bird film applicator, and allowing the drawdowns to age overnight before evaluation.

The relative tinting strength of the paints was determined by measuring the green reflectance of the standard (conventionally prepared slurry) and the test sample over the white portion of the chart. The resultant reflectance values are converted into K/S values by the Kubelka - Munk equation. The tinting strength of the sample being tested is then determined by the formula:

$$\text{Tinting Strength sample} = \frac{K/S \text{ Standard}}{K/S \text{ Sample}} \times 100$$

The results for the paints made from the slurries of Examples 1-5, as compared to the standard, were as follows:

| Sample | Tinting Strength |
| --- | --- |
| Standard | — |
| Ex. 1 | +2% |
| Ex. 2 | equal |
| Ex. 3 | +4% |
| Ex. 4 | +2% |
| Ex. 5 | +2% |

Accordingly, paints having equivalent or better tinting strength are obtained from the slurries of the present invention while eliminating or decreasing the need for the expensive and energy-intensive steps of drying and fluid-energy milling a highly coated titanium dioxide pigment.

EXAMPLE 7

The procedure of Example 1 was repeated to prepare a titanium dioxide pigment slurry except that prior to the combustion of the titanium tetrachloride aluminum chloride was added such that 1.2% by weight aluminum oxide, based on the weight of resultant titanium dioxide, was "burned in" the pigment. The remainder of Example 1 was performed on this material including the sodium aluminate addition.

The tinting strength of the resultant slurry was evaluated according to the procedure of Example 6, in comparison with a conventionally prepared slurry.

The results were:

| Sample | Tinting Strength |
| --- | --- |
| Standard | — |
| Ex. 7 | +7% |

This example shows the further beneficial effects in the present invention from the use of a base titanium dioxide which was formed in the presence of low amounts of aluminum oxide.

What is claimed is:

1. In an aqueous titanium dioxide pigment slurry having high hiding power, a solids content of about 55 to 70 percent by weight, and an effective amount of a dispersing agent, the improvement comprising using undried, unmilled hydroclassified fines as the source of the titanium dioxide wherein said fines pass through a 325 mesh screen and are coated with about 0.3 to 3 percent by weight of hydrous aluminum oxide.

2. The slurry of claim 1 wherein up to about 60 percent of the fines is replaced by dried and milled titanium dioxide pigment.

3. The slurry of claim 1 wherein the fines are formed by the combustion of titaniferous salts.

4. The slurry of claim 3 wherein the combustion of titaniferous salts is performed in the presence of aluminum chloride so as to burn in up to about 2 percent by weight aluminum oxide.

5. The slurry of claim 1 wherein the fines are derived from the hydrolysis of a titanium iron sulfate solution.

6. The slurry of claim 5 wherein the resultant hydrolysate is calcined in the presence of an aluminum salt so as to burn in up to about 2 percent by weight aluminum oxide.

7. The slurry of claim 1 wherein the solids content is about 60 to 65 percent by weight.

8. The slurry of claim 1 wherein the fines, which are in the form of a dilute slurry, are concentrated by filtration or evaporation of the water.

* * * * *